United States Patent
Glidden et al.

[19]

[11] Patent Number: 5,969,501
[45] Date of Patent: Oct. 19, 1999

[54] PORTABLE SOLAR POWER SYSTEM

[76] Inventors: Steven C. Glidden, 311 Peach Grove La., Santa Barbara, Calif. 93105; Guerin G. Alker, 19 Hollister Rd., Gaviota, Calif. 93117

[21] Appl. No.: 08/892,056
[22] Filed: Jul. 14, 1997
[51] Int. Cl.$^6$ .................................................. H02J 7/00
[52] U.S. Cl. ................................ 320/101; 320/136
[58] Field of Search .......................... 320/101; 136/245, 136/244

[56] References Cited

U.S. PATENT DOCUMENTS

| | | | |
|---|---|---|---|
| 4,261,329 | 4/1981 | Walsh et al. | 126/569 |
| 4,421,943 | 12/1983 | Withjack | 136/246 |
| 5,244,508 | 9/1993 | Colozza | 136/245 |
| 5,379,596 | 1/1995 | Grayson | 136/245 |
| 5,520,747 | 5/1996 | Marks | 136/245 |
| 5,522,943 | 6/1996 | Spencer et al. | 136/245 |

OTHER PUBLICATIONS

Photogenset Brochure, Solar Electric Specialties, Willits, CA, Mar. 1996.

*Primary Examiner*—Peter S. Wong
*Assistant Examiner*—Lawrence Luk
*Attorney, Agent, or Firm*—Roland H. Shubert

[57] ABSTRACT

A trailer mounted, self contained solar power system having a plurality of solar panel sections that are arranged to fold about the sides and top of the trailer. The panel sections unfold and lock together through slide rams that are contained within a rack structure supporting the panel sections to form a planar array that is easily deployable at a desired angle to the horizontal. The planar array pivots about a hinge along one side of the trailer top, and the panel sections are asymmetrically arranged so that positioning of the planar array can be easily accomplished.

12 Claims, 9 Drawing Sheets

PORTABLE SOLAR POWER SYSTEM

TECHNICAL FIELD

This invention relates generally to a portable solar power system that employs photovoltaic cells to produce electricity.

More specifically, this invention relates to a trailer mounted, self contained solar power system having a mechanical advantage with an asymmetrically arranged array of solar panels so that the system can be quickly and easily deployed.

BACKGROUND ART

Solar power systems that employ photovoltaic cells to convert the radiant energy of sunlight directly into electrical energy are well known in the art. Such systems find particular use in remote locations and during emergency situations in which conventional electrical sources have been disrupted. The systems are typically employed to power communications equipment, to supply field hospitals and aid stations, to provide emergency lighting, and for other similar purposes.

Portable, trailer mounted, solar power systems are also known, and one such system is described in U.S. Pat. No. 4,421,943. That system utilizes solar panels that are pivotally mounted to a base so that the panels may be deployed in any position between horizontal and vertical. The panels are arranged so that they may be stored inside the base when not in use or during transport of the system.

Folding, solar panel arrays have been used in a number of specialized applications. One such application is shown in U.S. Pat. No. 5,522,943 in which a foldable solar panel is arranged to function as a portable power supply for a computer or similar electronic device. Another folding, solar panel array is described in a patent to Grayson, U.S. Pat. No. 5,379,596. The Grayson patent shows a solar collector array that is used to power a portable refrigerator or heated storage chest. The solar panel assembly folds around the chest for transport, and is pivotally mounted so that it can be adjusted to be perpendicular to the direction of the sun.

Folding, solar cell panel arrays are also commonly used in space applications to supply power for satellites and the like. U.S. Pat. No. 5,520,747 depicts one such system. The patent describes a series of solar panels that are stowed in a folded configuration for launch. Upon reaching the desired orbit, the panels are deployed into an extended planar configuration. Solar panel arrays that are designed for use in space are not satisfactory for terrestrial applications as the deployed array is quite fragile and not designed to withstand normal weather conditions.

SUMMARY OF THE INVENTION

This invention comprises a portable, trailer carried, solar power system including a plurality of solar panel sections that are mounted upon a rack structure to form a planar array. The rack structure with its attached panel sections folds about the top and sides of the trailer for storage and transport and can be easily deployed as a planar unit at many desired angles from vertical to horizontal. A first panel section is sized to rest on the trailer roof, and an edge of that section is mounted to a hinge member disposed along one side of the trailer top so that the planar array is pivotable about the hinge axis. A second panel section is hinged to the first panel section on the first panel side opposite the hinge member, and a third panel section is hinged to the first panel side adjacent the hinge member, and the width of the third panel section is at least twice that of the second panel section.

Hence, it is an object of this invention to provide a solar power system that includes a solar panel array that can be quickly deployed by one person.

It is another object of this invention to provide a transportable, trailer-mounted solar power system with a plurality of solar panel sections that can be deployed to form a planar array.

Other objects and advantages of this invention will become apparent from the following description of a preferred embodiment of the invention.

DESCRIPTION OF PREFERRED EMBODIMENTS OF THE INVENTION

Figure 1:
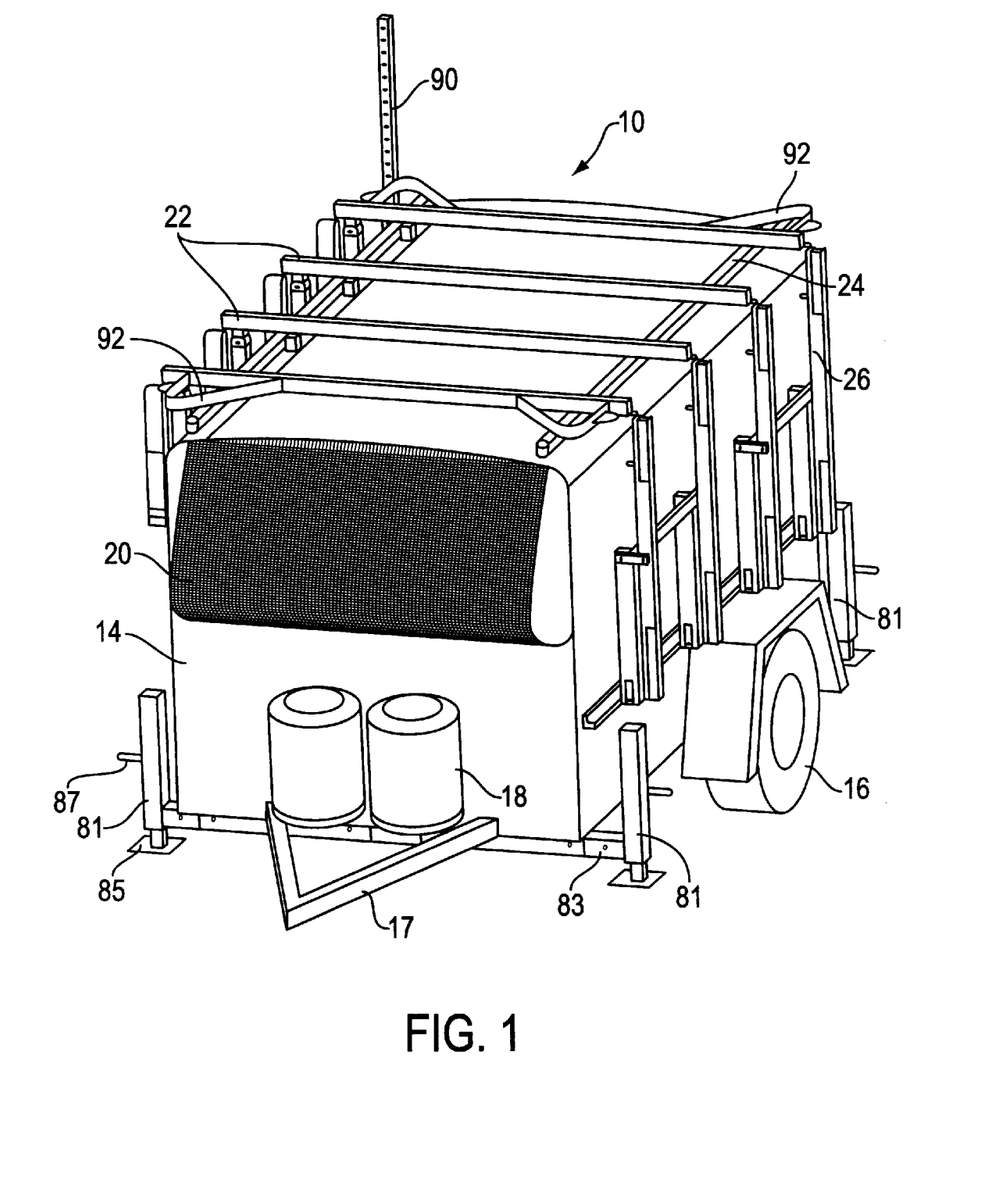
FIG. 1 is a front perspective view of the portable solar power system of this invention including a trailer with the racking structure upon which solar panel sections are mounted.

The trailer mount and racking structure for a portable solar power system made in accordance with this invention is indicated generally by the reference numeral 10 in FIG. 1. The trailer includes a box-like compartment 14 that is mounted upon a pair of wheels 16. A hitch 17 is provided at the trailer front for towing by a light truck or other suitable vehicle. compartment 14 serves as a shelter for ancillary equipment that may include a battery system, a DC to AC inverter, an engine generator for peaking or supplemental power and associated control systems. Fuel, suitably propane, for the engine generator is carried in tanks 18 that may be mounted at the front of the trailer. A streamlining nose cone 20 may also be placed at the trailer front to reduce the wind load on the trailer during transport and deployment.

Figure 2:
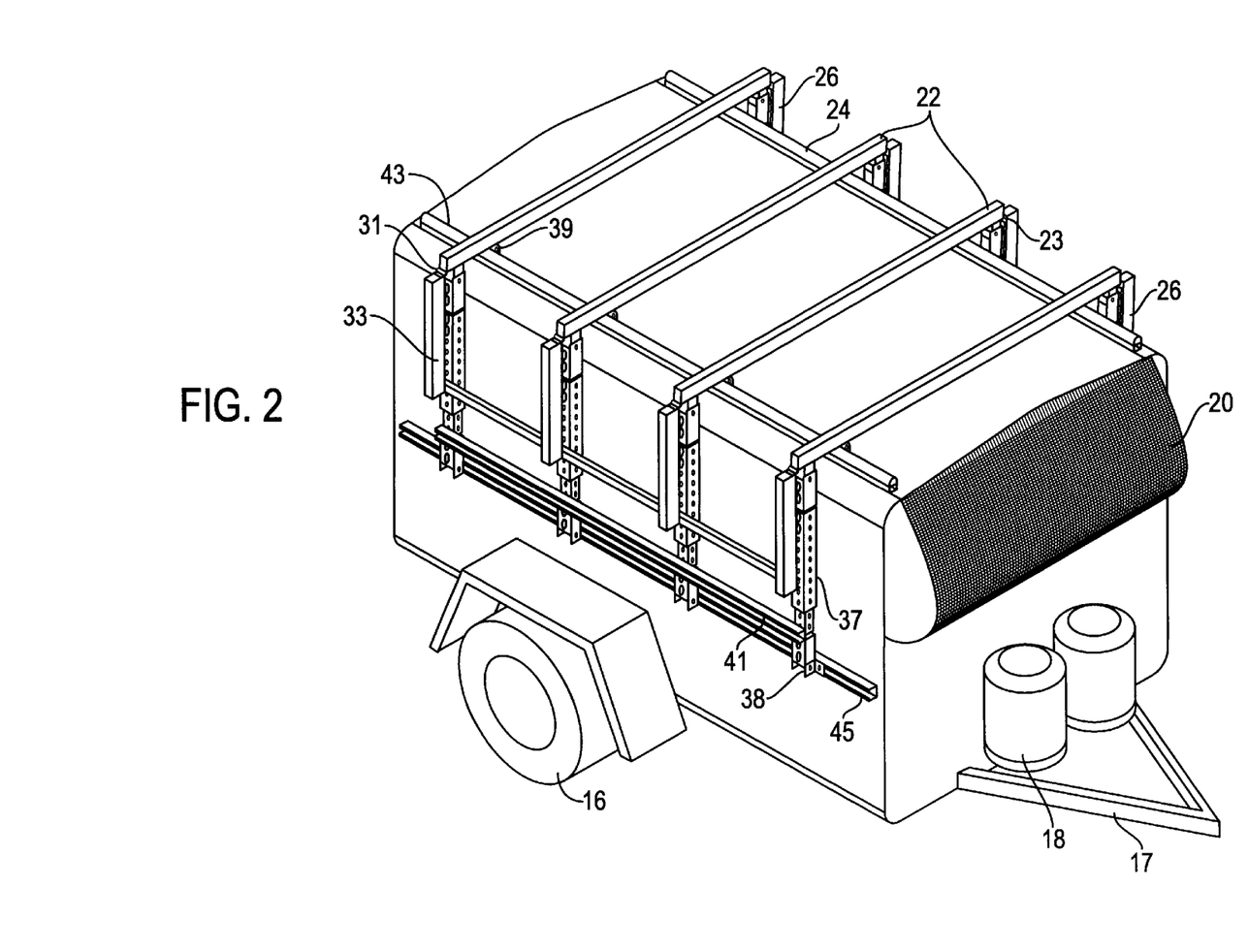
FIG. 2 is a right side perspective view of the trailer and racking structure of FIG. 1.
Figure 3:
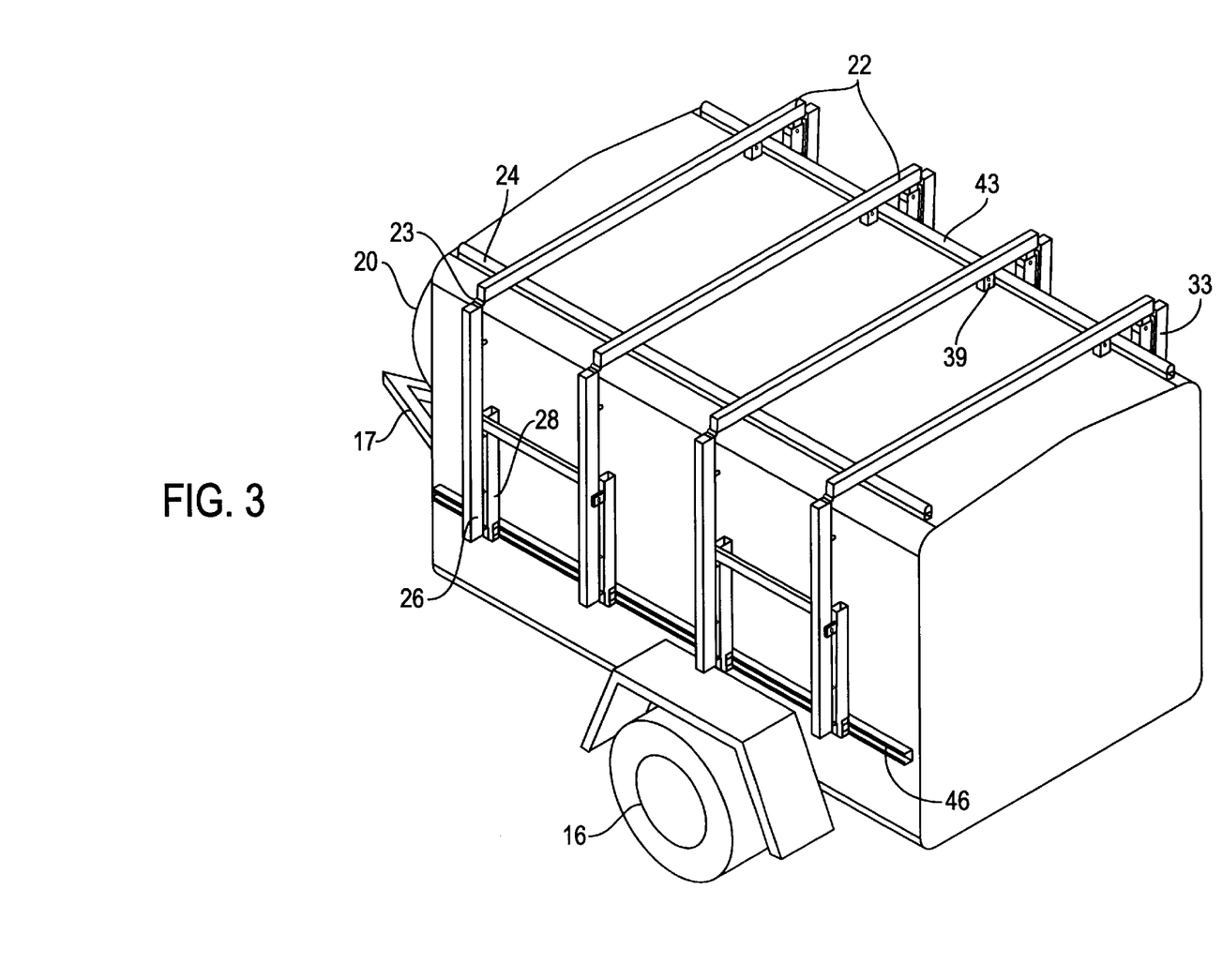
FIG. 3 is a left side perspective view of the trailer and racking structure of FIG. 1.
Figure 10:
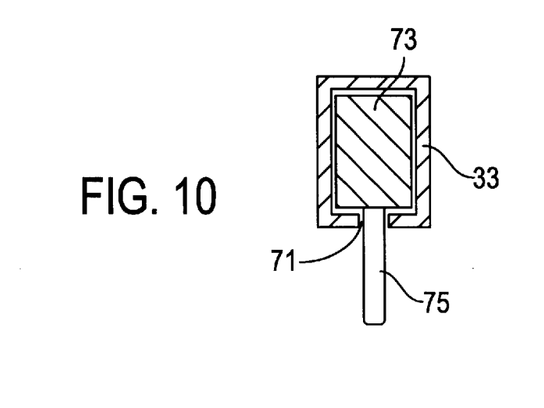
FIG. 10 is a sectional view of the slide ram taken along lines 10—10 of FIG. 9.

Referring now to FIGS. 2 and 3, as well as to FIG. 1, the racking structure for the solar panel array is shown in various views. The racking structure includes a plurality, suitably about four, main rail segments 22 that extend transversely across the top of trailer compartment 14. The rail segments 22 preferably are fabricated of metal "C" channel, that is, a rectangular box with a continuous slot formed in one of the short box sides as is shown in more detail in FIG. 10. The slot side of the rail segments is oriented to be on the bottom.

A rotatable hinge rail 24 extends longitudinally the length of trailer box 14 near one side of the trailer box top. Each main rail segment 22 is secured to hinge rail 24 and pivots about rail 24. The hinge side end of each rail segment 22 extends beyond the side of trailer box 14 and is attached by pivot means 23 to an end of hinge side extension rail 26 such that extension rail 26 is free to hang downwardly from the end of segment 22 as is most clearly shown in the view of FIG. 3. A wing rail 28, in turn is hinged at axis 29 to the other end of extension rail 26, and is arranged to re-fold inwardly and upwardly as is depicted in FIG. 3. The other end of each main rail segment 22 is hinged at pivot means 31 to top side extension rail 33. The free ends of extension rails 33 are interconnected through strut 35. It is preferred that hinge side extension rail 26, wing rail 28, and top side extension rail 33 all be fabricated from the same stock and have the same cross sectional dimensions.

Also attached to the end of each main rail segment 22 at a location just inboard of its connection to extension rail 33 is an adjustable panel support brace 37. Brace 37 is arranged to freely pivot about its attachment to rail segment 22 in a direction perpendicular to the longitudinal trailer axis. The free end of each brace 37 is formed as a yoke 38 for connection to a corresponding rod end member 39 in a clevis type arrangement to hold the deployed solar panel at the desired angle as will be described in more detail later. The yoke ends of braces 37 are connected through strut 41 so that all may be raised together for connection to the corresponding rod end members 39. Holding strips 45 and 46 are provided along the right and left sides of the trailer body to secure the panel support braces 37 and the extension rails 28 and 33 during transport. A support rail 43 extends along the trailer box top 14 parallel to hinge rail 24 at the side of the trailer box opposite the hinge rail to provide support for rail segments 22 when they are in a stowed or transport position. Rod end members 39 are preferably located just inboard rail 43, and may be mounted to that rail.

Figure 7:
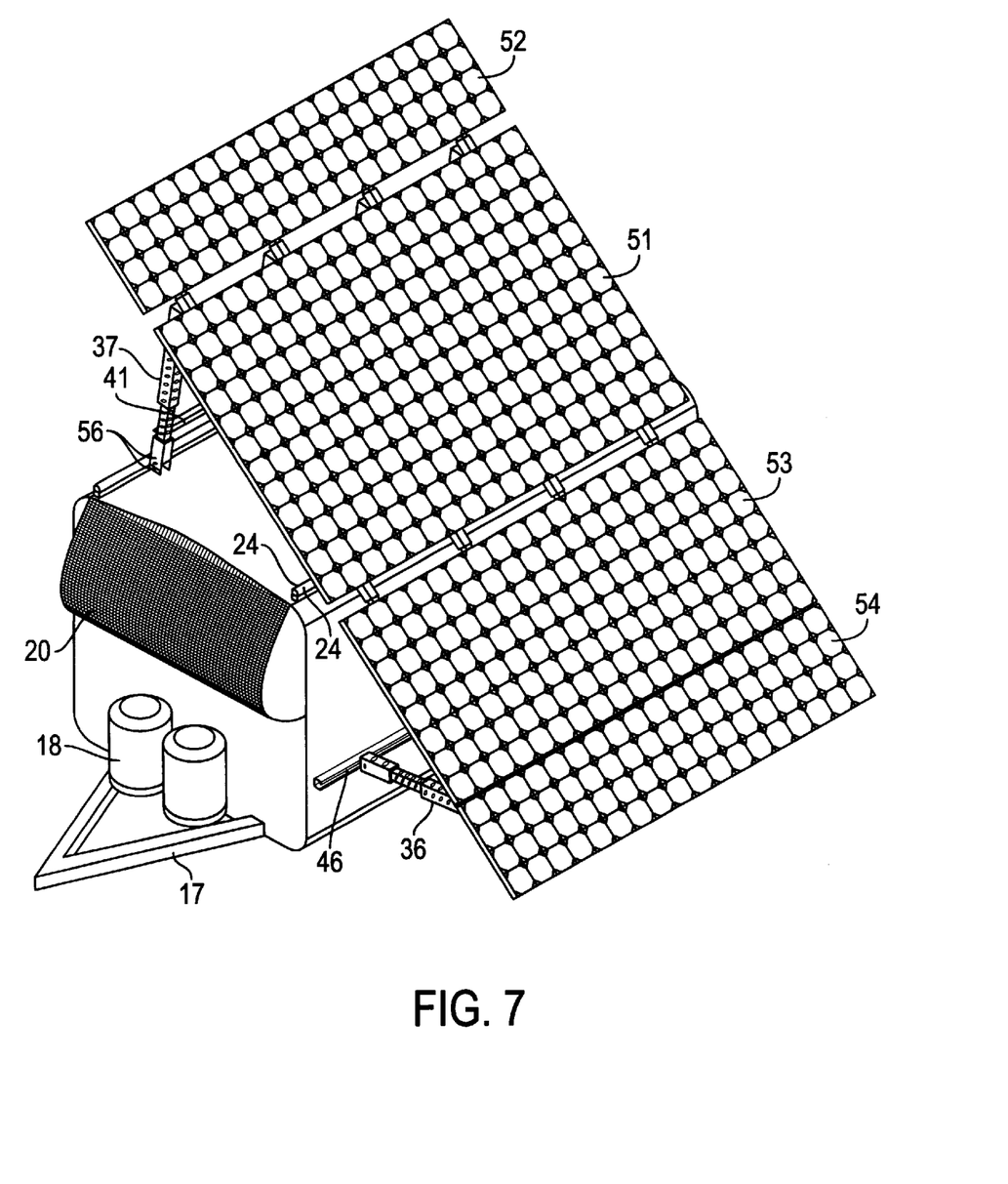
FIG. 7 is a left side perspective view of the system of FIG. 4 with the solar panel array deployed at an angle that is perpendicular to the direction of the sun.

Turning now to FIGS. 4, 5, 6 and 7, there is shown the racking structure of FIGS. 1–3 with solar panels mounted thereon in various stages of deployment. As is best seen in FIG. 7, a preferred embodiment of this invention utilizes four solar panel sections, a main panel section 51, a top panel section 52, a lower panel section 53, and a wing panel section 54. Each panel section is made up of a plurality of individual solar cells, preferably high efficiency, single crystal cells such as those sold by Siemens Solar Industries, arranged in columns and rows to form a modular panel section. The panel sections are securely mounted upon the racking structure that was described earlier. All of the panel sections are of the same length but some or all of the sections may differ in width. Both the length and width of the panel sections are proportioned to the size of the trailer that carries the racking structure. A trailer that is suitable for use in this invention may, for example, be eight feet long, five feet wide, and five feet high. A main panel section 51 for that particular trailer would then be about five feet wide and a maximum of about eight feet long. The combined width of lower panel section 53 and wing panel section 54 must be, at a minimum, at least twice the width of top panel section 52.

Figure 4:
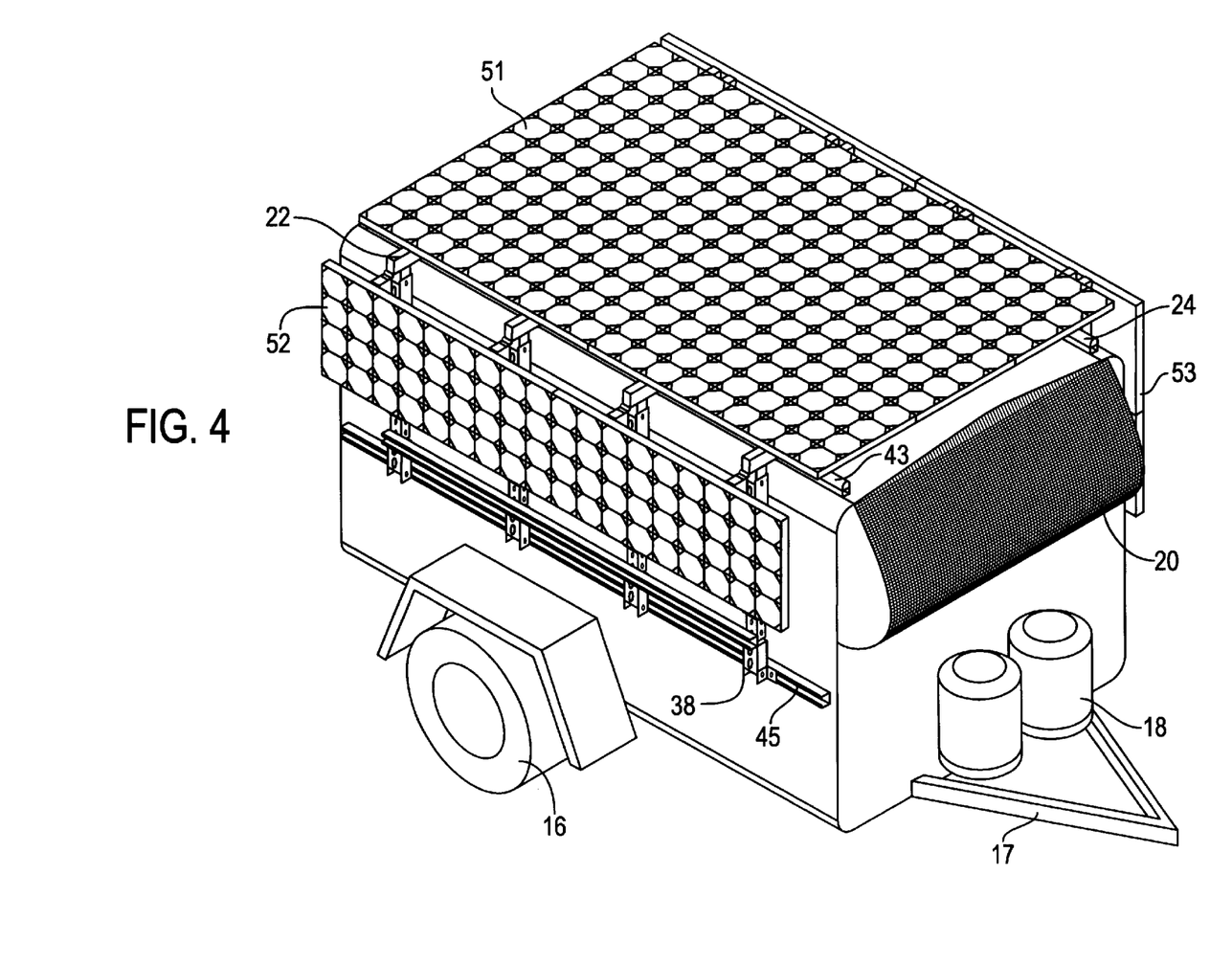
FIG. 4 is a right side perspective view of the portable solar power system of this invention including a trailer with the solar panel sections on the racking structure stowed and folded for travel.
Figure 5:
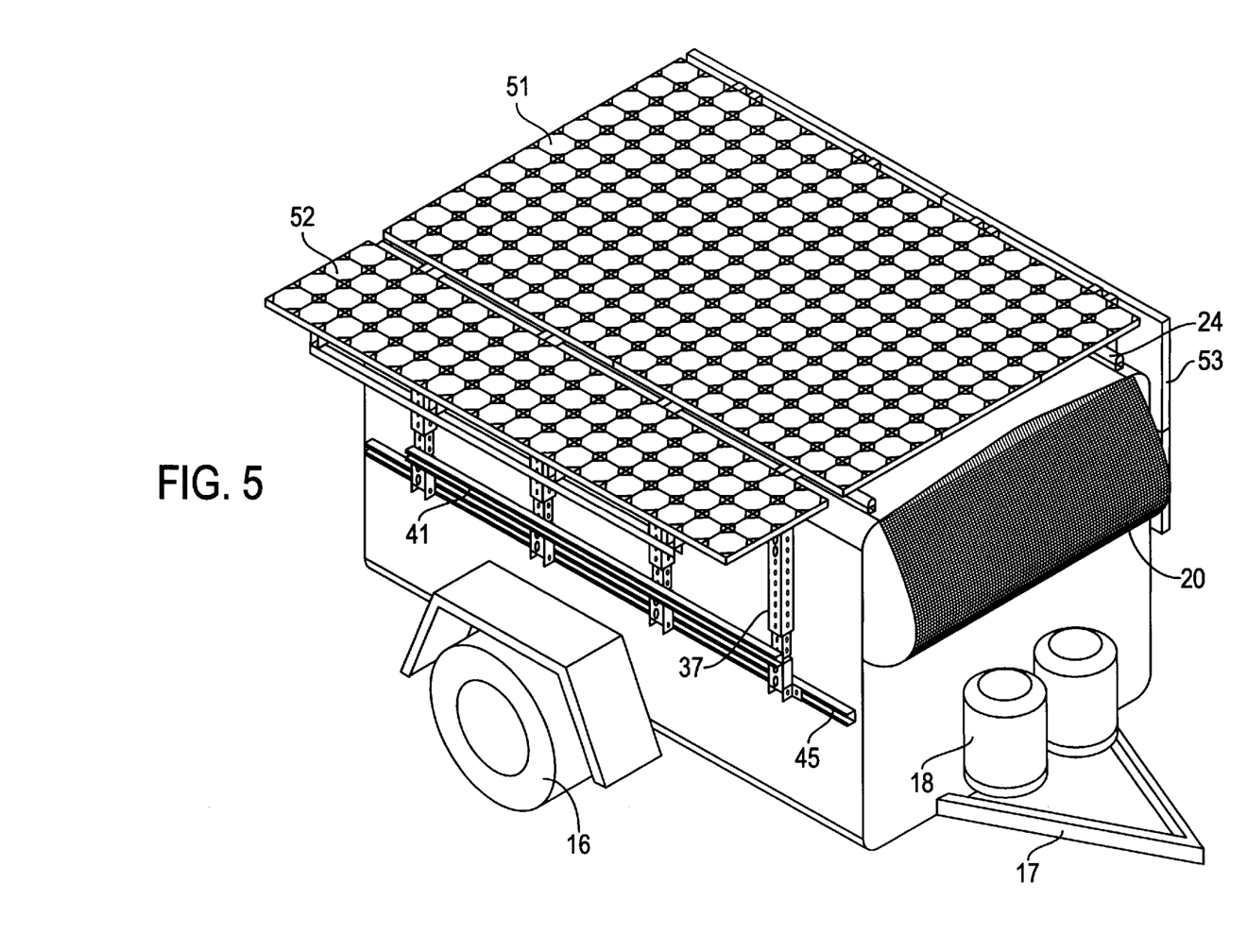
FIG. 5 is a right side perspective view of the system of FIG. 4 with the right side extension panel in a deployed position.
Figure 6:
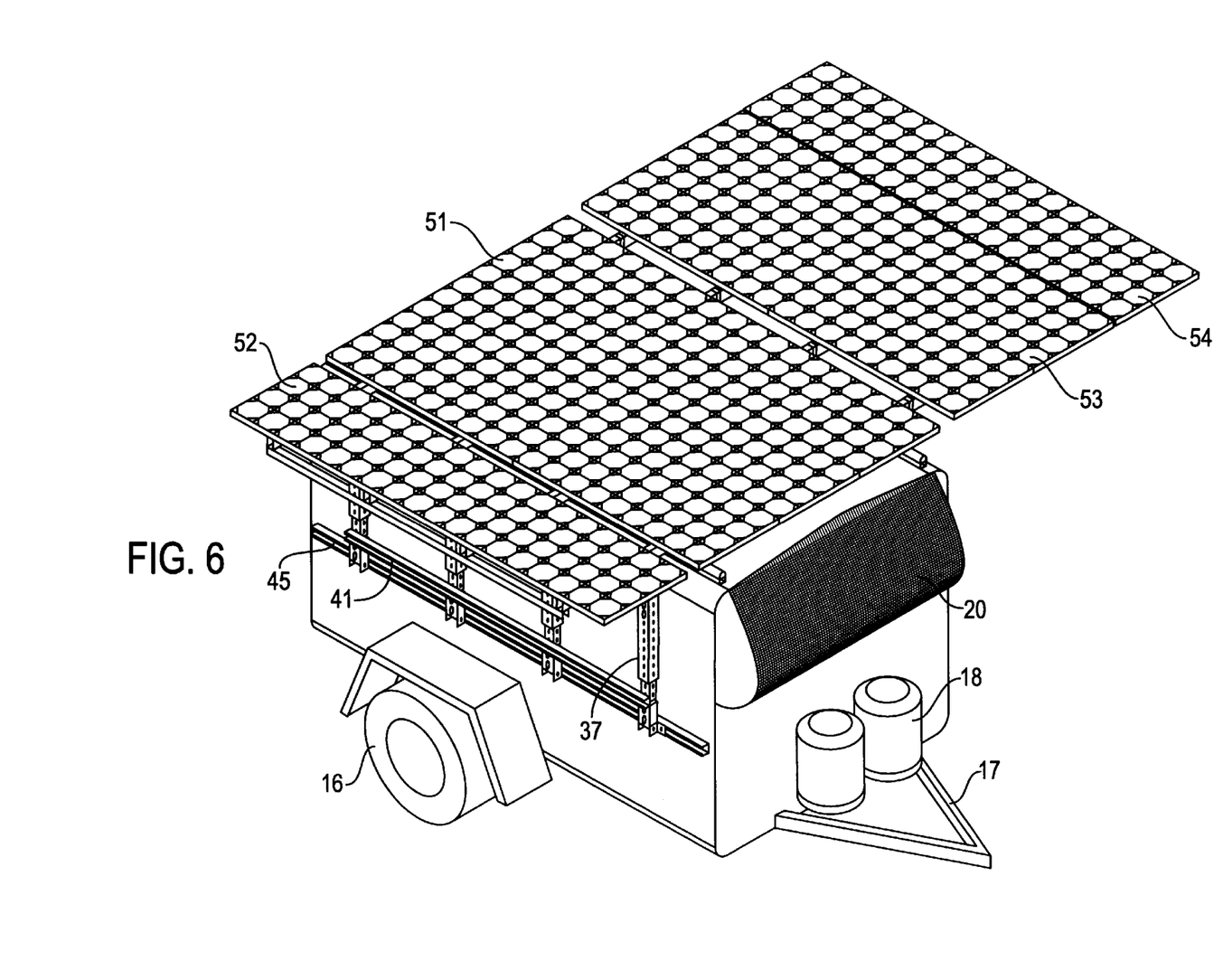
FIG. 6 is a right side perspective view of the system of FIG. 4 with both the right and left side extension panels in a horizontally deployed position.

Referring now to FIG. 4, the solar panel sections are depicted in a fully stowed, or transport, mode. Main panel section 51 lies flat across the trailer top, top panel section 52 hangs downwardly along the right trailer side, lower panel section 53 hangs downwardly along the left trailer side, and wing panel section 54 is re-folded between panel section 53 and the side of the trailer. Deployment of the panel sections to form a planar array is carried out stepwise. As is shown in FIG. 5, the top panel section 52 is secured in a position parallel to and planar with main section 51. Next, (see FIG. 6) lower panel section 53 and wing panel section 54 are deployed parallel to panel sections 51 and 52 to form a planar array that is disposed horizontally across the top of the trailer.

Figure 8:
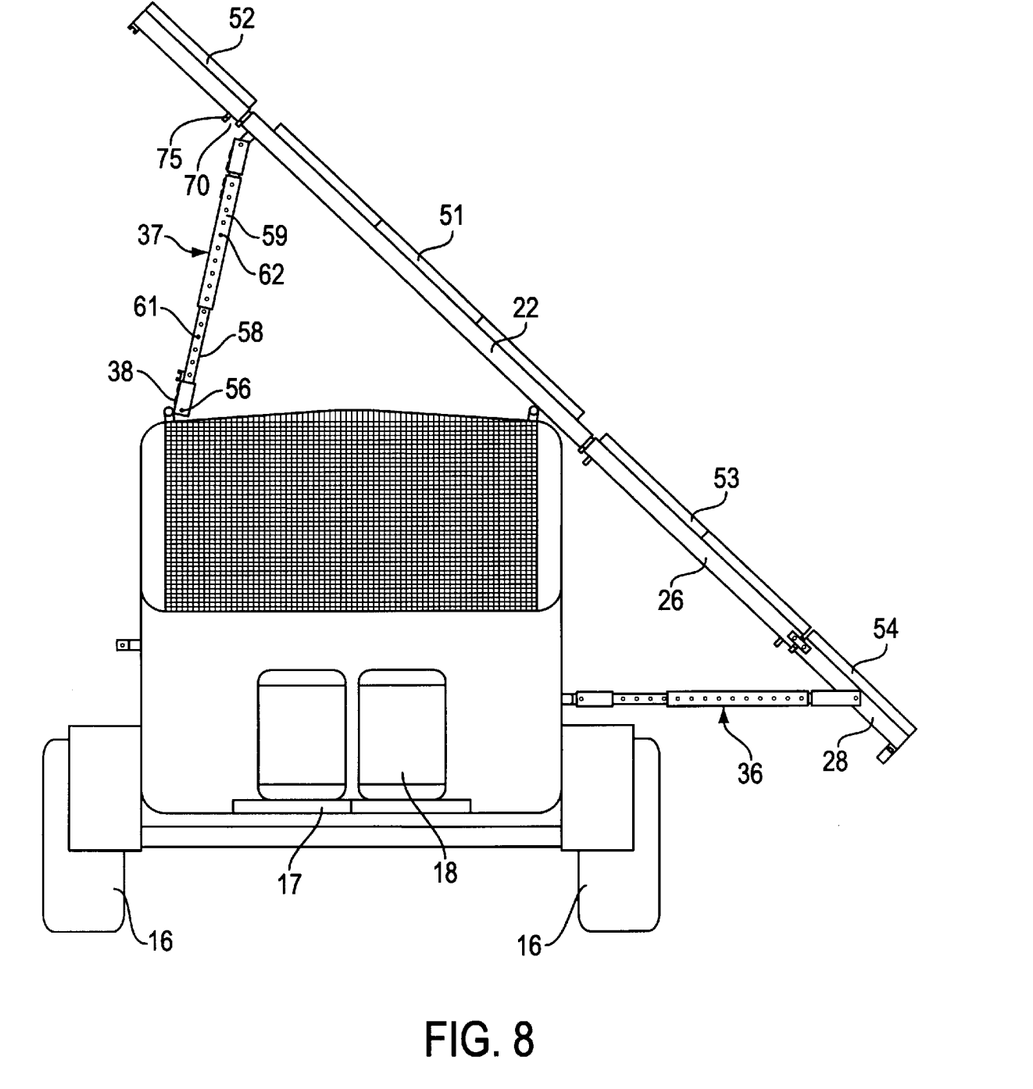
FIG. 8 is a front view of the deployed solar panel array of FIG. 7.

As is illustrated in FIGS. 7 and 8, the entire planar array is then tilted to an angle that provides optimum interception of incident solar radiation by pivoting the array about hinge rail 24. Because of the placement of the hinge rail near one side of the trailer top and the asymmetrical arrangement of the panel array, with the width of the top panel section being substantially less than that of the lower panel section, deployment of the planar array to the desired angle can be easily accomplished. The panel array is secured at an angle to the horizontal by connecting the yoke ends 38 of adjustable upper panel support braces 37 to rod end members 39 using a pin or bolt 56.

The angle that the planar array makes with the horizontal is determined by the length of upper support brace 37. Brace 37 includes an inner leg 58 that is slidably insertable into outer leg 59. The length of support brace 37 is changed by sliding the inner leg 58 in and out within the outer leg 59. As can readily be seen from FIG. 8, changing the length of brace 37 also changes the angular position of panel sections 51, 52, 53 and 54 that make up the planar array. Inner leg 58 and outer leg 59 are provided with a plurality of holes 61 and 62 along much of their lengths, and the holes are placed so that holes within the inner leg can be collimated with respect to those in the outer leg. A removable pin 64 is then inserted through a set of collimated holes to fix the position of inner leg 58 relative to that of the outer leg 59, and thus establish the length of support brace 37. In like manner, a second group of lower support braces 36 extend between the side of the trailer adjacent hinge rail 24 and wing panel section 54 to support the lower part of the panel array. Lower support braces 36 are like upper support braces 37 except that they are somewhat shorter in length.

Figure 9:
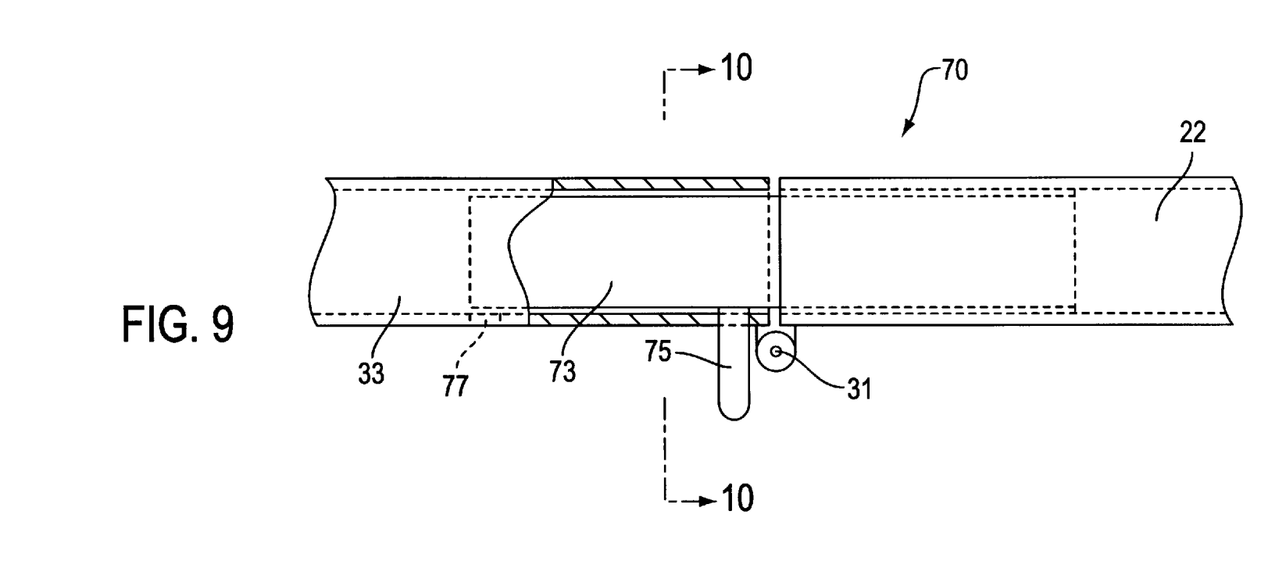
FIG. 9 is a partial break away view of a slide ram that is used to lock rack segments in a straight, extended position.

A particularly preferred embodiment of this invention employs a slide ram arrangement 70 to lock rack segments in a straight, extended position. That embodiment, illustrated in partial break-away view in FIG. 9 and in section in FIG. 10, requires that the rail segments 22, 26 28 and 33 be shaped as a rectangular "C" channel having a continuous slot 71 running along the bottom channel side. For purposes of illustration, in FIG. 9 there is shown an end of a top side extension rail 33 that is attached through pivot means 31 to main rail segment 22. A ram body 73 is dimensioned to slidably fit within the channel formed by the interior of rail segments 22 and 33. Ram body 73 may comprise an elongated, rectangular metal bar having a handle 75 attached to the mid part thereof. Handle 75 extends downwardly through slot 71 and is free to move longitudinally within slot 71 from pivot means 31 to handle stop 77. The ram body 73 is dimensioned and the handle 75 and stop 77 are positioned such that, when the handle is at the stop, the entire ram body is contained within rail segment 33, thus allowing rail segments 33 and 22 to move freely about pivot means 31. When the handle is moved to the opposite limit of its travel, adjacent pivot means 31, one end of ram body 73 extends into rail segment 22 beyond pivot 31 thus fixing the two segments in a straight end-to-end position. The length of ram body 73 must be sufficient to hold straight the pivoted ends of two rail segments without imposing undue bending stresses on the segments. At a minimum, the length of ram body 73 that extends into rail segment 22 should be at least twice the height of the interior segment channel and the overall length of the ram body should be at least four times the height of the interior segment channel.

Referring again to FIG. 1, there is also illustrated certain features that enhance the performance of the solar power system under adverse conditions. Wind striking against the large surface area of the deployed solar cell array can create large tipping forces. In those circumstances, the trailer can be braced against tipping by providing stabilizing jacks 81 at each trailer corner. Jacks 81 may be mounted on telescoping support members 83 that can be extended outwardly at the deployment site to provide a greater support base for the trailer. Each jack 81 has a base 85 that is raised up and down through a screw turned by crank 87 to adjust to uneven terrain. An extendable mast 90 may be provided for mounting a radio or microwave antenna. Attachment loops 92 may also be provided for connection to lifting means such as a crane or helicopter.

It is to be understood that other modifications in form or detail can readily be made without departing from the spirit of the described invention. It is intended that the invention be not limited to the exact form and detail that is described but to be limited only by the appended claims.

We claim:

1. A portable, solar power system comprising:
   a trailer including a rectangular box-like compartment with a generally flat roof and vertical sides, the longitudinal axis thereof extending from the front to the rear of said compartment, said trailer adapted for towing by a powered vehicle;
   a rack structure attached to said trailer through pivot means, said rack having a plurality of rail segments extending perpendicularly to said longitudinal axis across the trailer top and along the trailer sides, said pivot means disposed along one side of said compartment roof; and
   a plurality of solar panel sections mounted on said rack structure, each of said solar panel sections including a plurality of individual solar cells arranged in columns and rows, a first of said panel sections sized to rest on the top of said compartment roof, a second of said panel sections hinged through said rack structure to said first panel section on the first panel side opposite said pivot means, and a third of said panel sections hinged through said rack structure to said first panel section on the first panel side adjacent said pivot means, the width of said third panel section being greater that of said second panel section.

2. The system of claim 1 including a fourth solar panel section, said fourth section hinged to said third panel section on the third panel side opposite said first panel section.

3. The system of claim 2 wherein the combined width of said third and fourth panel sections is more than twice that of said second panel section.

4. The system of claim 3 wherein the rack structure upon which said solar panel sections are mounted comprises rail segments hinged end to end.

5. The system of claim 4 wherein said rail segments are formed of metal "C" channel.

6. The system of claim 5 wherein said rack structure includes locking means to hold said panel sections parallel one to another to form a planar array.

7. The system of claim 6 wherein said locking means comprises a slide ram having a ram body contained within said rail segments, said ram body arranged to be movable longitudinally within said rail segments between a first stop and a second stop.

8. The system of claim 7 wherein the ram body when moved to said first stop is entirely within a first rail segment, and wherein said ram body when moved to said second stop extends into a second rail segment that is hinged to the end of said first rail segment, thereby fixing said first and second rail segments in a straight end-to-end position.

9. The system of claim 6 wherein said planar array is deployed at a selected angle to the horizontal by tilting said array about said pivot means, and wherein said array is secured at the selected angle by means of a plurality of adjustable support braces that extend from the compartment roof on the side of said compartment roof opposite said pivot means to an upper part of said tilted array.

10. The system of claim 9 wherein said adjustable support braces each include an inner leg that is slidably insertable into an outer leg, said braces including locking means to fix the position of said inner leg relative to said outer leg, thereby establishing the length of the braces.

11. The system of claim 9 including a second group of adjustable support braces that extend from the side of said compartment adjacent said pivot means to a lower part of said tilted array.

12. The system of claim 1 including stabilizing jacks positioned at each corner of said compartment, each of said jacks mounted on an outwardly extendable support member and having an adjustable base to adjust to uneven terrain.

* * * * *